United States Patent [19]

Heinrich et al.

[11] Patent Number: 4,918,343
[45] Date of Patent: Apr. 17, 1990

[54] BRUSHLESS ALTERNATOR

[75] Inventors: Martin W. Heinrich, Cedar Grove; James A. Ten Hoven, Sheboygan Falls, both of Wis.

[73] Assignee: Kohler CO., Kohler, Wis.

[21] Appl. No.: 257,476

[22] Filed: Oct. 13, 1988

[51] Int. Cl.[4] .......................... H02K 9/00; H02K 9/06; H02K 47/20
[52] U.S. Cl. ........................ 310/58; 310/62; 310/113; 310/59
[58] Field of Search .................. 310/112, 113, 114, 65, 310/62, 63, 58, 258, 68 D, 59

[56] References Cited

U.S. PATENT DOCUMENTS

| | | | |
|---|---|---|---|
| 2,634,379 | 4/1953 | Brainard | 310/67 |
| 2,650,992 | 9/1953 | Forss et al. | |
| 2,796,542 | 6/1957 | Bekey et al. | 310/162 |
| 3,020,427 | 3/1960 | Wheeler et al. | 310/59 |
| 3,487,457 | 12/1969 | Drouard et al. | 310/86 |
| 3,743,873 | 7/1973 | Jong | 310/114 |
| 4,055,778 | 10/1977 | Binder | 310/89 |
| 4,138,629 | 2/1979 | Miller et al. | 310/198 |
| 4,250,423 | 2/1981 | Linscott, Jr. | 310/258 |
| 4,297,784 | 11/1981 | Vagman | 29/596 |
| 4,501,983 | 2/1985 | Schmider | 310/113 |
| 4,647,806 | 3/1987 | Giuffrida | 310/68 D |
| 4,689,507 | 8/1987 | Baker et al. | 310/62 |

FOREIGN PATENT DOCUMENTS

| | | | |
|---|---|---|---|
| 3306775 | 8/1984 | Fed. Rep. of Germany | 310/59 |
| 16040 | 1/1987 | Japan | 310/58 |
| 1304137 | 4/1987 | U.S.S.R. | 310/114 |
| 953066 | 3/1964 | United Kingdom | 310/114 |

Primary Examiner—Patrick R. Salce
Assistant Examiner—C. LaBalle
Attorney, Agent, or Firm—Quarles & Brady

[57] ABSTRACT

A brushless alternator for an engine-generator set has a housing for mounting to the engine. Raised ribs define an internal bore of the housing, the bore having a constant diameter to mount the stator and the exciter field assembly, both of which have the same laminations. The ribs also define cooling air flow paths through the housing. A fan is mounted outside of the housing at the free end of the housing to draw air into the engine end, through the housing and out the free end.

10 Claims, 4 Drawing Sheets

BRUSHLESS ALTERNATOR

BACKGROUND OF THE INVENTION

This invention relates to brushless alternators, and in particular to a brushless alternator for mounting to an engine as a component of an engine-generator set.

Brushless alternators for converting mechanical energy to electrical energy are well known. Such alternators usually have an exciter field assembly fixed to a housing and an exciter armature mounted on a rotary shaft and inductively coupled to the exciter field assembly. An electrical current is induced in the exciter armature, in accordance with well known electromagnetic principles, and the exciter armature is electrically connected, usually including a conversion to direct current, to a rotor which is also mounted on the shaft. A stator is fixed in the housing around the rotor and is inductively coupled to the rotor. Thereby, an output voltage is induced in the stator.

The stator, rotor, exciter field assembly, and exciter armature are all made of coils of wire wound around multiple thin steel laminations. The laminations are stamped from sheet stock, usually coated with a varnish for insulation and stacked together. Prior alternators have used different laminations for the stator and the exciter field assembly, which has required a relatively large investment in tooling for making the laminations, as well as a corresponding difficulty in making the housing and assembling the stator and the exciter field to the housing.

Prior brushless alternators have been either stand alone units or sometimes have been made as part of a self-contained internal combustion engine-generator set. When made as a component of an engine-generator set, the alternator housing has typically been mounted to the engine housing and the engine shaft coupled to the alternator shaft. This has involved a problem in design, since the engine, of which there are many types with different housing-shaft relationships, has defined the relationship between the alternator housing mounting and shaft mounting.

Cooling has also been a problem in prior alternators. Fans have usually been mounted on the alternator shaft to draw cooling air through the alternator. However, prior air flow paths were circuitous, taking many bends and encountering restrictions, such that cooling was not adequate, which degraded the efficiency of the alternator and promoted wear.

SUMMARY OF THE INVENTION

This invention provides a brushless alternator having a housing, means for mounting the housing, and a shaft coaxial with and extending through the housing. The shaft is mounted rotatably relative to the housing and an exciter field assembly is fixed to and inside of the housing. An exciter armature is mounted on the shaft to rotate with the shaft at an axial location in alignment with the exciter field assembly so that the exciter armature is radially inside of the exciter field assembly. A rotor is also mounted on the shaft inside the housing and a stator is fixed to and inside of the housing at an axial location in alignment with the rotor so that the rotor is radially inside of the stator. Each of the exciter field assembly, exciter armature, rotor and stator has a plurality of laminations which are stacked together. The housing defines an internal bore in which both the exciter field assembly and the stator are fixed. The bore has an internal diameter which is the same at the axial locations where the exciter field assembly and the stator are positioned. The outside peripheries of the laminations of the stator and exciter field assembly are also identical in size and shape to one another to fit within the internal bore of the housing. Thus, this aspect of the invention achieves manufacturing efficiencies by making the housing with a single bore for both the stator and exciter field assembly and making laminations for the stator and exciter field assembly which are similar. In a preferred form, the laminations of the stator and the exciter field assembly are identical and interchangeable in size and shape with one another and the rotor and the exciter armature laminations can be made from either a center blank of a stator lamination or a center blank of an exciter field lamination.

In another aspect of the invention, the housing has integral raised ribs which extend axially and are circumferentially spaced apart around the interior of the housing. The ribs define open spaces between them and define the internal diameter of the housing bore in which the stator and the exciter field assembly are mounted.

In another aspect, the housing has an engine end where means for mounting the housing to the engine are located. The housing has a free end opposite from the engine end and a fan is mounted on the shaft outside of the housing at the free end of the housing. The fan rotates with the shaft to draw cooling air into the housing through air intake slots located at the engine end of the housing. The air continues through the housing, past the stator, through the open spaces defined by the raised ribs, and is exhausted through the free end of the housing. In this aspect, it is especially desirable to position the means for mounting the shaft rotatably relative to the housing at the free end of the housing between the stator and the fan. This provides axial distance for the cooling air to turn radially inward to be exhausted through the free end of the housing. This arrangement of the fan outside the housing at the free end of the housing also provides for versatility in the fan design as well as for relatively unobstructed air flow through the housing and a shorter overall length of the alternator. It is also preferred in this aspect to position the exciter coils at the engine end of the housing relative to the intake air slots so that the intake air can flow unobstructed past the outside of the exciter coils.

In another aspect, a drive hub is mounted on the engine end of the shaft to drivingly couple the shaft to a prime mover to which the housing is mounted. Bolts fix the drive hub and the exciter armature to a flange which is integral with the shaft. In this way, facile disassembly of the drive hub and exciter armature are provided for so that the alternator may be adapted to different prime movers and to aid servicing.

Thus, it is a principle object of the invention to provide a brushless alternator which is easy and inexpensive to manufacture.

It is another object of the invention to provide a brushless alternator in which the housing can be easily machined and in which tooling costs are minimized by using the same or similar laminations in the coils which are mounted in the housing.

It is another object of the invention to provide a brushless alternator which is relatively short in length.

It is another object of the invention to provide a brushless alternator which has an efficient cooling system.

It is another object of the invention to provide a brushless alternator which provides for versatility in the design of the cooling system.

It is another object of the invention to provide a brushless alternator which can be adapted to different prime mover configurations.

The foregoing and other objects and advantages of the invention will appear from the following description. In the description, reference is made to the accompanying drawings which form a part hereof, and in which there is shown by way of illustration a preferred embodiment of the invention. Such embodiment does not necessarily represent the full scope of the invention, however, and reference is made therefore to the claims herein for interpreting the scope of the invention.

DETAILED DESCRIPTION OF THE PREFERRED EMBODIMENTS

Figure 1:
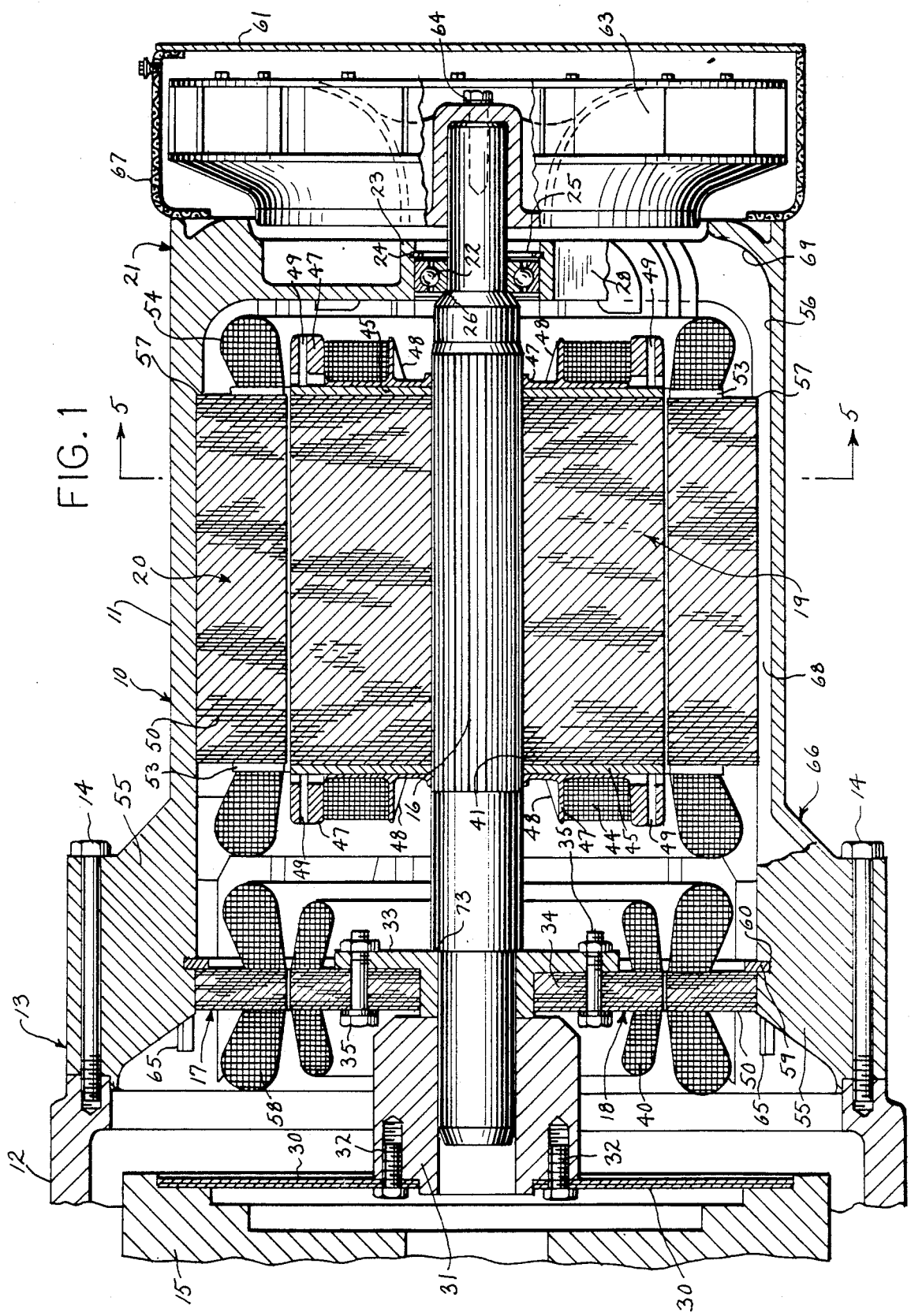
FIG. 1 is a sectional view of a brushless alternator of the invention illustrated as part of an engine-generator set.

A preferred embodiment of a brushless alternator 10 of the invention for use with an engine-generator set is shown in FIG. 1. Brushless engine-generator sets are well known in the art. In operation, the mechanical work produced by an engine is converted into the electrical energy output of the brushless alternator 10.

A housing 11 of the alternator 10 is shown mounted to an engine housing 12 at an engine or open end 13 using bolts 14. Except for a portion of a flywheel 15 of the engine, the remainder of the engine is not shown in the drawings. The engine rotates the flywheel 15, which in turn rotates a shaft 16 of the alternator 10. A current is applied to an exciter field assembly 17 mounted inside the housing 11 and which is inductively coupled to an exciter armature 18 which rotates with the shaft 16. This induces a current in the armature 18, which is electrically connected to a rotor 19. The resulting magnetic field produced by the current flowing through the rotor 19 induces an electromotive force in a stator 20 capable of providing an alternating current when a load is applied to the alternator 10. A voltage regulator (not shown) usually measures the output of the alternator 10 and regulates the direct current flowing to the exciter field assembly 17. Other well known electrical elements also may be used in such brushless alternators, which need no discussion here. For example, the alternating current induced in the exciter armature 18 is usually converted to direct current by a rectifier (not shown) before being directed to the rotor 19.

The shaft 16 extends through and is coaxial with the housing 11. The shaft 16 is journaled to a closed or free end 21 of the housing 11 by a bearing 22 which is press fit into a hub 23 (FIGS. 1, 6 and 7) of the housing 11. Axial movement of the bearing 22 is limited by a positioning ring 24 (FIG. 1) which is inserted into an annular groove 25 (FIGS. 1 and 6) of the hub 23, and by a bearing shoulder 26 of the shaft 16. Spokes 27 (FIG. 7) of the housing 11 extend radially outward from the hub 23 and define exhaust vents 28 between them. A mounting support 29 (FIG. 7) that extends beneath the housing 11 can be used to position the alternator 10.

At the engine end 13 of the housing 11, the shaft 16 is rotatively supported by the engine flywheel 15 through the use of stacked drive disks 30 (FIG. 1) which are generally made from sheet steel. The radially outer portion of the drive disks 30 is bolted or otherwise suitably fixed to the flywheel 15. FIG. 1 illustrates one way of attaching the drive disks 30 to the shaft 16. As is common practice in the art, the radially inner portion of the drive disks 30 is connected to the shaft 16 using a heat shrunk or press fit drive hub 31. The drive hub 31 is mounted on the engine end 13 of the shaft 16 and connected to the drive disks 30 by suitable bolts 32. By connection in this manner, the flywheel 15 rotatively supports the shaft 16 so that their axes of rotation are aligned and they rotate together. Use of the drive disks 30 along with the heat shrunk or press fit drive hub 31, as is well known in the art, provides a flexible connection between the shaft 16 and the flywheel 15 to accommodate minor axial misalignments and imbalances.

Figure 4:
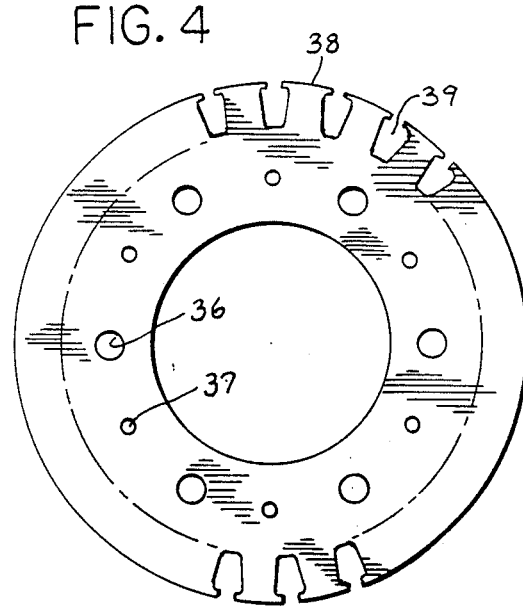
FIG. 4 is a side elevation view of an exciter armature lamination.

Located axially inboard of and adjacent to the drive hub 31 is a collar 33. The collar 33 is press fit onto the shaft 16 between the drive hub 31 and a collar shoulder 73 in the shaft 16. Exciter armature laminations 34, shown stacked together in FIG. 1, are thin, flat, generally annular sheets of a ferrous material used to minimize the eddy-current loss associated with the flux path through the exciter armature 18. The stacked laminations 34 are secured to the collar 33 by suitable bolts 35. A single exciter armature lamination 34 is shown in FIG. 4. Interspersed near the radially inner portion of each lamination 34 are bolt holes 36 and fixturing holes 37 used to align the laminations 34 during stacking. The bolts 35 pass through the bolt holes 36 of the stacked exciter armature laminations 34 and fasten the exciter armature laminations 34 to the collar 33. Poles 38 (FIG. 4) extend radially outward from the lamination 34 and form open channels 39 between the poles 38. Individual exciter armature laminations 34 are stacked together (FIG. 1) so that the poles 38 and the channels 39 of each lamination 34 align with one another. Exciter armature windings 40 are wound through the channels 39 of the stacked exciter armature laminations 34.

Figure 3:
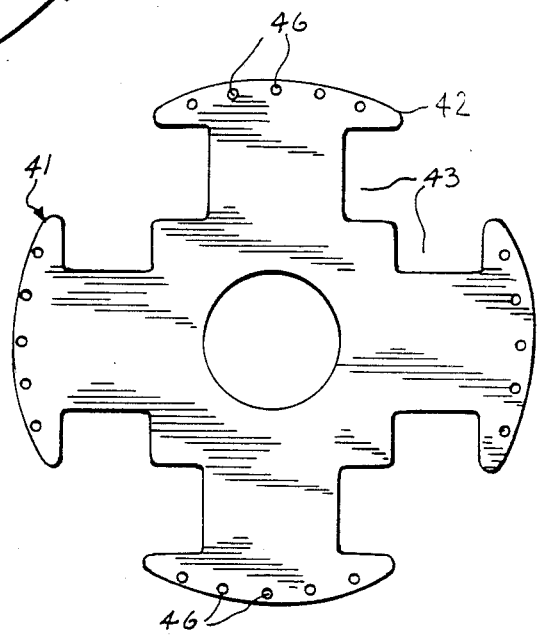
FIG. 3 is a side elevational view of a rotor lamination.

A portion of the shaft 16 is splined, knurled, or otherwise fitted to receive in driving engagement the rotor 19 (FIG. 1) so that the shaft 16 and the rotor 19 rotate together. The general construction of the rotor 19 is well known. The rotor 19 includes many rotor laminations 41 which are stacked together and press fit onto the shaft 16 which passes through the interior hole defined by the stack of laminations 41. As is well known, the laminations 41 are used to minimize the eddy-current loss associated with the flux path through the rotor 19. A single lamination 41, shown in FIG. 3, is a thin, flat, generally annular sheet of a ferrous material.

Figure 5:
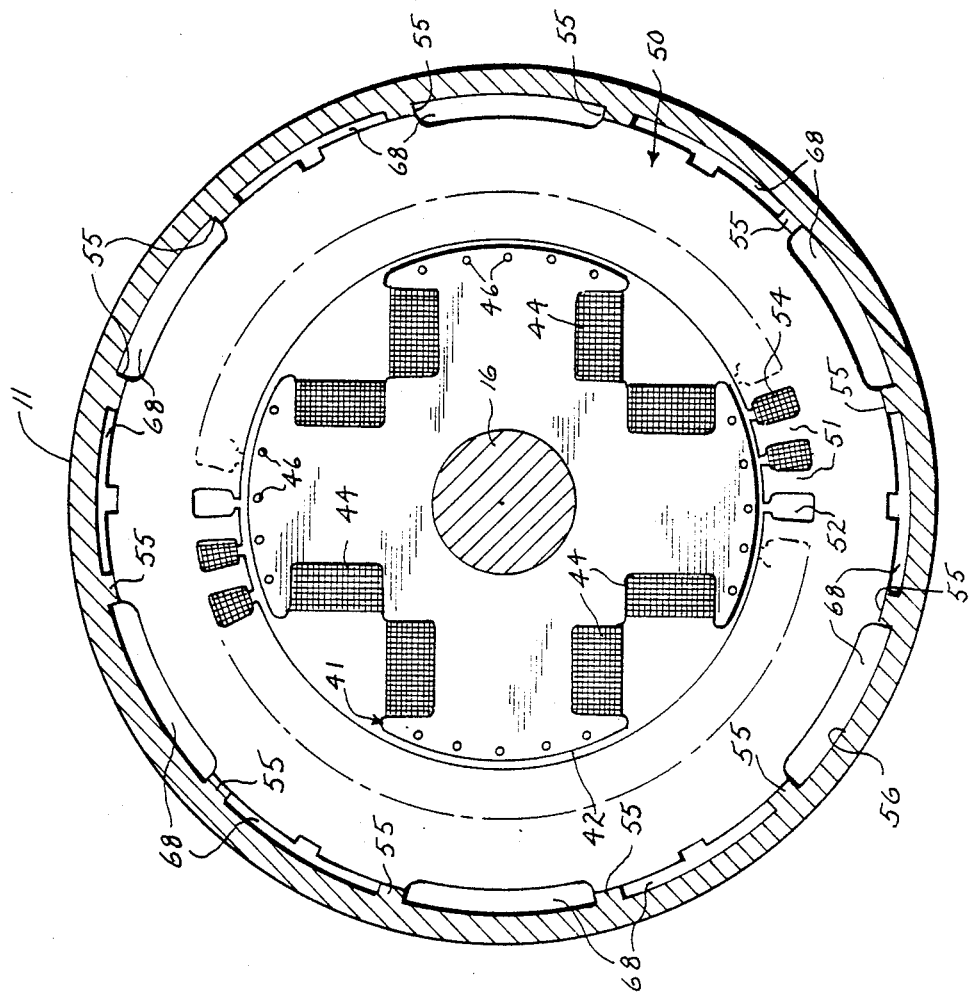
FIG. 5 is a sectional view of the alternator taken from the plane of the line 5—5 of FIG. 1.

In the preferred embodiment, the rotor lamination 41 has four poles 42 and eight channels 43 formed between the poles 42. A rotor winding 44 is wound through the channels 43 of the stacked rotor laminations 41 and around the end of the laminations 41 (FIGS. 1 and 5).

Referring to FIG. 1, an end plate 45, typically made from copper or aluminum, is positioned on each end of the stacked rotor laminations 41. Each end plate 45 is in the general shape of, although thicker than, rotor lamination 41. Damper bars (not shown), also typically made of copper or aluminum, are inserted in holes 46 (FIG. 3) of the stacked laminations 41. The ends of the damper bars are welded or otherwise suitably attached to the end plates 45. As is well known, the end plates 45 and the damper bars together form a damper circuit to short out currents induced in the face of the rotor laminations 41.

A rotor insulator 47 made of suitable insulating material is positioned on each side of, and extending axially outward from, the end plates 45. The rotor windings 44 are wound over the rotor insulator 47 at the end turns and hold the rotor insulator 47 in place. In this way, the rotor insulator 47 insulates the windings from the damper circuit and supports the windings 44 from centrifugal forces caused by rotation of the shaft 16. A gusset 48 strengthens a radially inner wall of the rotor insulator 47 which must restrain the windings 44 during winding. The radially outer portion of the rotor insulator 47 contain pin holes 49 in which pins can be placed to secure weights (not shown) to correct for imbalance of the rotor 19.

Figure 2:
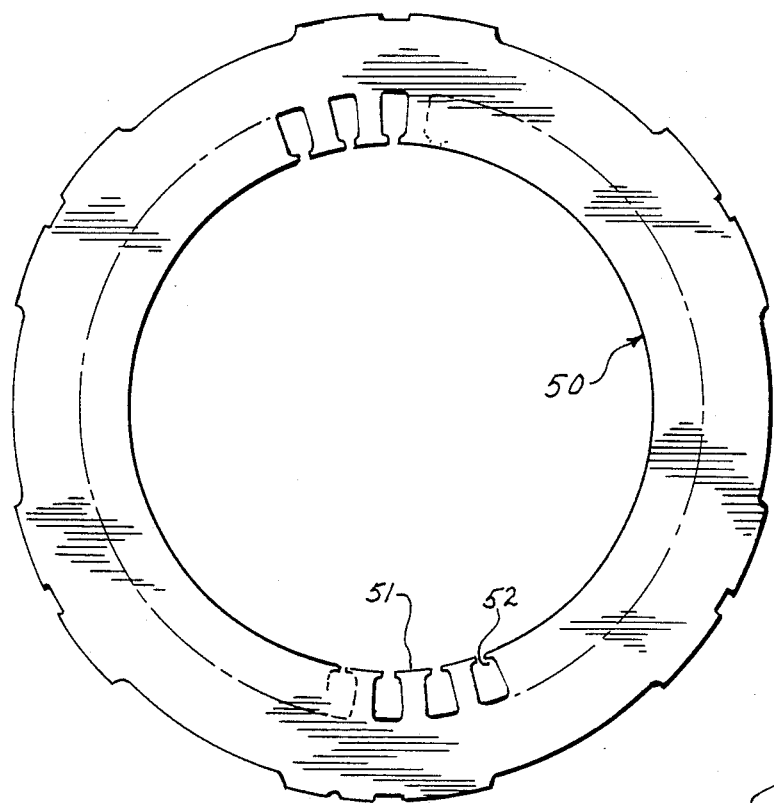
FIG. 2 is a side elevational view of a lamination used to construct both the stator and the exciter field assembly.

The rotor 19 is mounted at an axial location on the shaft 16 to rotate inside the stator 20. The stator 20 (FIG. 1) includes a plurality of stator laminations 50 which are thin, flat, generally annular sheets of a ferrous material. An individual stator lamination 50 is shown in FIG. 2. Poles 51 of the lamination 50 extend radially inward and form open channels 52 between them. Individual stator laminations 50 are stacked together (FIG. 1) so that the poles 51 and the channels 52 of each lamination 50 align with one another. A slot insulator 53 made of paper or other suitable insulating material runs through the channels 52 of the stacked laminations 50 and covers the ends of the stacked laminations 50. Stator windings 54 (FIGS. 1 and 5) are routed through the channels 52 of the stacked laminations 50 and over the slot insulator 53 at the end turns of the windings 54. The slot insulator 53 is used to insulate stator windings 54 from the laminations 50, according to usual practice.

The stator laminations 50 are positioned inside raised ribs 55 (FIGS. 1, 5 and 6), which are integral with the housing 11 and project radially inward from an inside wall 56 of the housing 11. Axially, the raised ribs 55 extend substantially the length of the housing 11 from the engine end 13 to the closed end 21. A shoulder 57 (FIGS. 1 and 6) formed in each of the raised ribs 55 is used to locate the laminations 50 inside the housing 11 before the laminations 50 are heat shrunk inside the raised ribs 55.

The outside periphery of the laminations 50 must be appropriately shaped to interface with the raised ribs 55 in a manner which will provide a secure interference fit. As seen in FIG. 5, the raised ribs 55 contact the laminations 50 where the two surfaces are substantially flat, thus permitting a secure fit between the raised ribs 55 and the lamination 50.

The exciter field assembly 17 (FIG. 1) is also positioned securely within the raised ribs 55 of the housing 11. The inside diameter defined by the raised ribs 55 is the same where the stator 20 and the exciter field assembly 17 are positioned. In fact, between the shoulder 57 and axially outboard of the field assembly 17, the ribs 55 are straight and define a constant inside diameter, except where they define a groove 60. Thus, the outer periphery of the exciter field assembly 17 and the stator 20 are of the same size and shape so that the same tooling can be used to make the laminations 50.

In the preferred embodiment, the inside peripheries of the exciter field assembly 17 and the stator 20 are also the same. By designing the stator and exciter field laminations 50 with the same inside and outside peripheries, the exciter field and stator laminations 50 can be made identical to one another in size and shape. This further reduces the tooling costs associated with producing laminations. As a further consequence of the stator and exciter field laminations 50 having the same internal diameter, the rotor laminations 41 and the exciter armature laminations 34 can be made from a center blank of either a lamination for the stator 20 or a lamination for the exciter field assembly 17.

The lamination 50 shown in FIG. 2 is used in both the stator 20 and the exciter field assembly 17. The only difference between the laminations 50 used in the stator 20 and those used in the exciter field assembly 17 is that the stator laminations 50 are annealed to give them desirable electrical properties for use with an alternating current which is carried in the stator windings 54.

An exciter field winding 58 (FIG. 1) which carries a direct current is wound between the poles 51 (FIG. 2) and through the channels 52 of the stacked exciter field laminations 50. A slot insulator (not shown) similar to the slot insulator 53 on the stator 20 is used on the exciter field assembly 17. The exciter field laminations 50 are mechanically held together and positioned against a snap ring 59 (FIG. 1) which fits in the grooves 60 (FIGS. 1 and 6) defined by the raised ribs 55. The exciter field laminations 50 are then heat shrunk inside the raised ribs 55.

Figure 6:
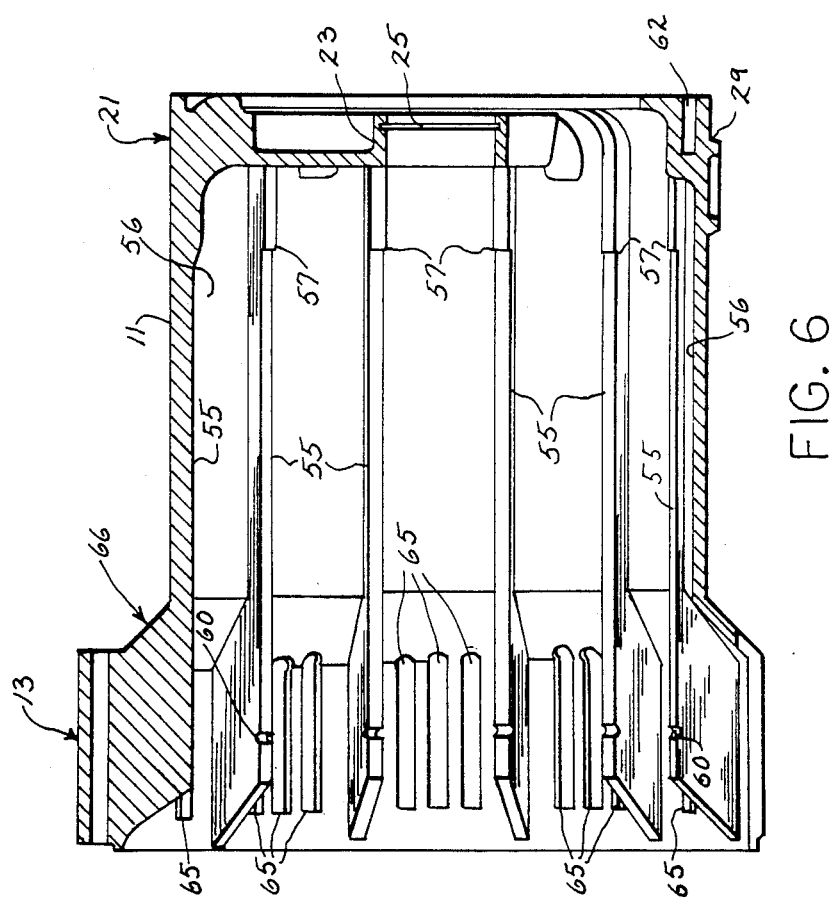
FIG. 6 is a sectional view of a housing for the alternator shown FIG. 1 taken along the plane of the line 6—6 of FIG. 7.

As discussed above, except for the grooves 60 in the raised ribs 55 to receive the snap ring 59, the inside diameter defined by the raised ribs 55 is constant from the shoulder 57 to near the end of the raised ribs 55 outboard of the exciter field assembly 17 at the engine end 13 of the housing 11 (Fig. 1 and 6). The inside diameter of the raised ribs 55 defines the internal bore of the housing 11. Building the alternator 10 using a single-piece housing 11 with a substantially uniform internal bore simplifies production of the housing 11 as well as assembly of the alternator 10.

Figure 7:
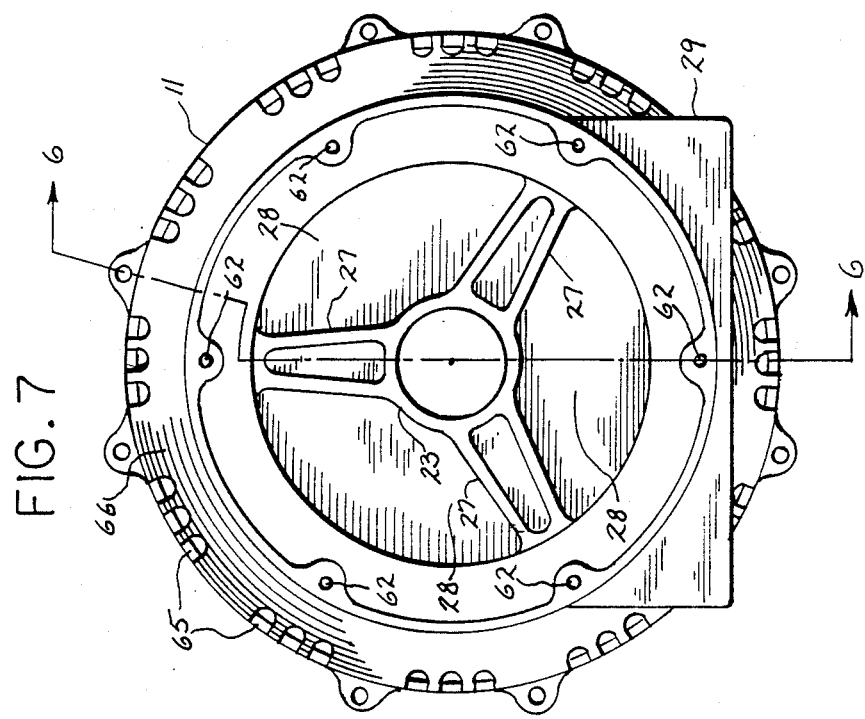
FIG. 7 is an end plan view of the housing of FIG. 6.

A fan shroud 61 is mounted on the exterior of the free end 21 of the housing 11 using fasteners (not shown) which are inserted into receiving holes 62 (FIGS. 6 and 7). A centrifugal fan 63 is fastened to the shaft 16 by an end bolt 64 or other suitable means so that the fan 63 rotates with the shaft 16 inside the fan shroud 61. The fan 63 draws cooling air into the housing 11 through air intake slots 65 (best shown in FIG. 6) located between the raised ribs 55 at the engine end 13 of the housing 11. As shown in FIGS. 1 and 6, the housing 11 flares out at the engine end 13 to create a bell shape and an enlarged portion 66. The air intake slots 65 are located in the enlarged portion 66 of the housing 11 between the raised ribs 55 which extend into and become deeper in the enlarged portion 66 of the housing 11.

The exciter field assembly 17 is positioned at an axial location inside the enlarged portion 66 of the housing 11 with the air intake slots 65 extending inboard and outboard of the exciter field assembly lamination 50. Thus, the exciter field assembly 17 is located inside the air intake slots 65 by a distance equal to the height of the raised ribs 55 in the enlarged portion 66 of the housing 11. Even if it was not bell shaped, however, the raised ribs 55 would still separate the inside surface 56 from the exciter field assembly 17 somewhat. Also, the portion of the intake slots 65 on the inboard side of the exciter field assembly lamination 50 would provide a flow path past the exciter field assembly 17 for unrestricted cooling air intake. The cooling air is then drawn through the length of the housing 11 before being expelled through a wire screen 67 or other suitable cooling air exit in the fan shroud 61.

One aspect of the invention provides versatility in cooling the alternator 10. Because the fan 63 is mounted exterior of the housing 11, the fan size is not limited by the housing size. Although not shown in FIG. 1, the outside diameter of the fan 63 could be larger than the housing 11. In this way, the flow rate of cooling air through the housing 11 can be adjusted as necessary by changing the size of the fan 63, which can be made larger than the housing 11 if need be.

Also, the fan housing 61 can be easily modified to control the cooling air flow. FIG. 1 illustrates a wire screen 67 used to guard the rotating fan 63 and provide an exit for the expulsion of cooling air. The mounting of the fan 63 exterior of the housing 11 allows adequate space to mount a fan scroll (not shown) or other suitable air control device on the fan housing 61 to direct the flow of expelled air or improve the efficiency of the fan.

Cooling air can take various paths through the housing 11. For instance, after entering the intake slots 65 and flowing past the outside periphery of the exciter field assembly 17 through open spaces 68 (FIGS. 1 and 5) defined by the raised ribs 55 and the inside wall 56 in the enlarged portion 66, the cooling air can travel a substantially straight path over the length of the housing 11 past the stator 20 through the open spaces 68 in the smaller portion of the housing 11. Cooling air travelling this path is not required to turn any sharp angles which would decrease the efficiency of the cooling air flow and thus decrease the efficiency of the alternator 10. This path requires only an initial slight turn in the air flow where the air leaves the enlarged portion 66 of the housing 11. A second direction change in the air flow occurs where the cooling air is drawn radially inward to go between the spokes 27 (FIG. 7) and through the exhaust vents 28. The flow characteristics of this are enhanced by a contour 69 (FIG. 1) at the free end 21 of the housing 11 to aerodynamically direct the cooling air through the vents 28 (FIG. 7). Cooling air taking this path through the open spaces 68 contacts and cools the outside periphery of the stator laminations 50. This air flow passes over the end turns of the stator windings 54 only once (at the free end 21 of the housing 11); it avoids this turn at the engine end of the stator 20 because it comes directly into the open spaces 68.

The placement of the fan 63 shown in FIG. 1 minimizes the overall length of the alternator 10. Cooling air enters the fan 63 axially and exits radially. Cooling air traveling axially along the inside wall 56 (FIGS. 1 and 6) of the housing 11 through the open spaces 68 (FIGS. 1 and 5) must come radially inward to enter the vents 28 (FIG. 7). To avoid having the cooling air turn a sharp corner, the bearing 22 is positioned axially between the rotor 19 and the fan 63 to advantageously provide axial lengths between the free end of the stator 20 and the fan intake. This allows the cooling air to travel axially as well as radially as it makes the turn to pass through the vents 28 and out through the fan 63. As a result, this design effectively utilizes the axial space required for the bearing 22 by providing a smooth air flow path that improves the efficiency of the alternator 10. Consequently, the overall length of the alternator 10 is minimized.

Air can flow over substantially the entire outer periphery of the stator and exciter field laminations 50. There are relatively few raised ribs 55, and they are narrower than they are tall. As shown in FIGS. 1, 5, and 6, this embodiment of the invention employs only twelve raised ribs 55. The stator 20 and the exciter field assembly 17 may be adequately supported, however, with as few as three raised ribs 55. Three raised ribs 55 are required to center the stator 20 and exciter field assembly 17 within the housing 11, but additional raised ribs may be required to provide the strength necessary to support the stator 20 and the exciter field assembly 17.

The width of the raised ribs 55 as shown in FIGS. 1, 5, and 6 is roughly equal to the height of the raised ribs 55, or the distance that the raised ribs 55 extend radially inward from the inside wall 56 of the housing 11 where the stator 20 is positioned. Narrow raised ribs 55 improve cooling because they allow cooling air to pass over substantially all of the outside periphery of the laminations 50. Additionally, the raised ribs 55 may be designed to function as cooling fins, conducting heat from the laminations 50 and providing increased surface area for convection heat transfer to the cooling air. The surface area in contact with the air flow can also be increased by modifying the design of the outside periphery of the stator and exciter field laminations 50, such as by using a toothed pattern as is well known. The shape of the outside periphery of the lamination 50 could take many forms so long as the laminations 50 are designed to be held by the raised ribs 55.

Most of the remaining cooling air which is drawn into the intake slots 65 turns radially inward between the exciter field assembly 17 and the stator 20 to flow axially through the open spaces between the rotor 19 and the stator 20; e.g., between the poles 42 or through the channels 52 which are not filled with windings 54. This air flow also only takes one turn past end windings (past the inboard windings 58). After that, it flows straight axially through the housing 11 and out the vents 28 to be exhausted by the fan 63.

Figure 8:
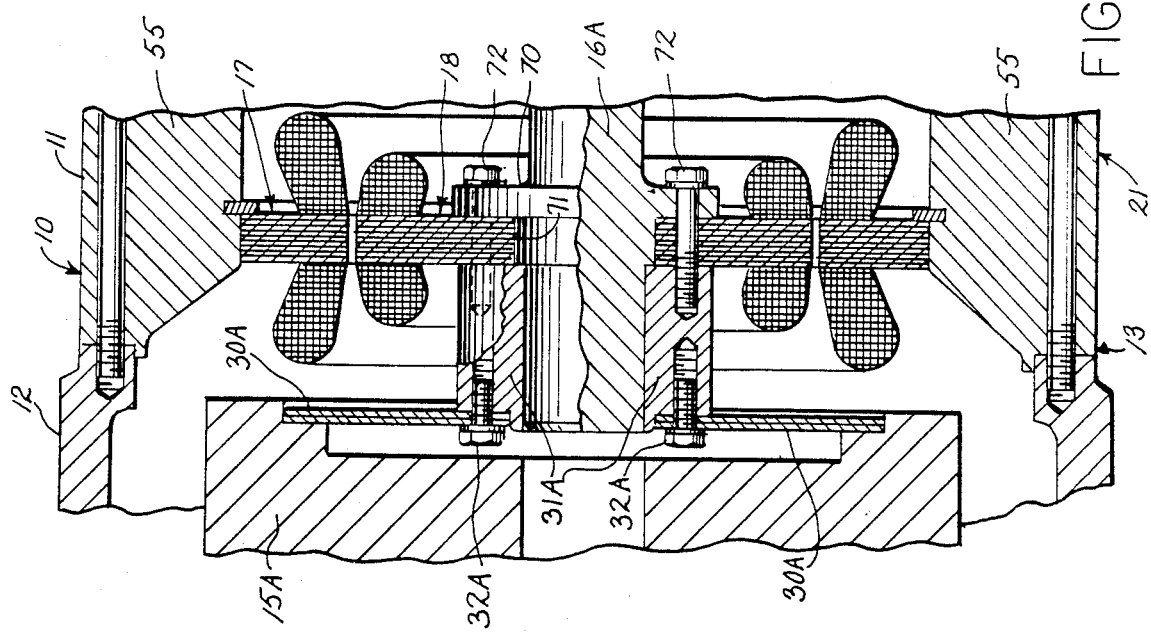
FIG. 8 is a fragmentary sectional view showing a second embodiment of the invention.

A second embodiment for coupling the shaft to the engine is shown in FIG. 8. The alternator 10 of FIG. 8 employs a shaft 16A that has an integral flange 70 and an integral land 71 near the engine end 13 of the housing 11. The exciter armature 18 is slid onto the land 71 with a small clearance, and a drive hub 31A is slid onto the engine end of the shaft 16A with a clearance fit adjacent to the exciter armature 18. The engine end of the drive hub 31A is fastened with suitable bolts 32A to drive disks 30A. The free end of the drive hub 31A is secured by suitable bolts 72 which draw the drive hub 31A securely against the exciter armature 18 and the armature 18 against the flange 70. By securing the drive hub 31A to the drive disks 30A by bolts 32A and to the flange 70 by bolts 72, the shaft 16A is rotatively supported at the engine end by a flywheel 15A without the use of a heat shrunk drive hub. The slide fit drive hub 31A of the present invention allows the same alternator 10 to be used with different engines and different sized flywheels 15A, and the slip fit of the hub 31A and the exciter armature 18 permits easy removal of the exciter armature 18.

Engine housings and flywheels of internal combustion engines are standardized by the Society of Automotive Engineers. Manufacturers produce engine housings and flywheels in standard sizes to promote interchangeability of component parts. For example, the engine housing 12 in FIG. 1 is made to a standard size so that an alternator 10 with a comparably sized housing 11 will fit all such standard sized engine housings 12. Likewise, different flywheels can be used within a single standard sized engine housing 12. The flywheel 15 in FIG. 1 represents one standard flywheel, while the flywheel 15A in FIG. 8 represents a different standard flywheel used with the same engine housing 12.

Using different flywheels 15 and 15A with the same engine housing 12 results in a different physical relationship between these parts. For example, a shorter drive disk 30A (FIG. 8) must be used to mount the larger flywheel 15A to the shaft 16A. The practice of using various sized drive disks (30 in FIG. 1 and 30A in FIG. 8) is well known in the art. Different flywheels, however, also affect the proximity of the drive disks to the mounting surface of the engine housing 12. For instance, the drive disks 30A in FIG. 8 are axially closer to the surface of the engine housing 12 where the alternator housing 11 is mounted, than are the drive disks 30 in FIG. 1. Alternators using a heat shrunk or press fit drive hub (Item 31 in FIG. 1) can not easily be adapted to accommodate a different sized flywheel or removed for service once the hub is installed. Removal of a heat shrunk or press fit drive hub commonly results in destruction of either the drive hub 31 or the shaft 16.

The drive hub 31A, however, is slip fit onto the shaft 16A so that the drive hub 31A can be easily removed to accommodate different sized flywheels 15 and 15A and improve serviceability by removing bolts 32A and bolts 72. To compensate for axial differences in length between different engine/flywheel combinations, drive hubs 31A of various lengths are used. For example, a relatively short drive hub 31A is shown in FIG. 8 in use with flywheel 15A which extends axially relatively close to the mounting surface of the engine housing 12. The flywheel 15 of FIG. 1, which is axially further from the mounting surface of the engine housing 12, could be used in place of flywheel 15A. According to the present invention, the drive hub 31A (FIG. 8) could easily be replaced without destruction of the hub 31A or the shaft 16A. Thus, a drive hub (not shown) in the same shape as, but longer than, the drive hub 31A in FIG. 8 could be used to compensate for the flywheel 15 being axially further from the mounting surface of the engine housing 12. In this way, a standard size alternator housing 11 can be used with a standard size engine housing 12, in combination with various size flywheels, such as the flywheels 15 and 15A in FIGS. 1 and 8.

According to the present invention as shown in FIG. 8, the exciter armature 18 is slidably mounted on the land 71 and secured by bolts 72. The present invention positions the exciter armature 18 at the engine end 13 of the housing 11, so that the exciter armature 18 can be easily accessed for repair or replacement. Additionally, because the exciter armature 18 is bolted in place, it can be inexpensively and quickly removed if damaged.

The foregoing detailed description has been for the purpose of illustration. Thus, a number of modifications and changes may be made without departing from the spirit and scope of the present invention. For example, the various stationary electrical components (dubbed the exciter field assembly and stator above) could be made to rotate while the rotating ones (dubbed the exciter armature and the rotor above) could be made stationary with corresponding changes made to their electrical functions as needed. Likewise, many of the items within the alternator 10 could be repositioned, e.g., the positions of the exciter and main coils could be reversed. Therefore, the invention should not be limited by any of the specific embodiments described, but only by the claims.

We claim:

1. A brushless alternator, comprising:
   a housing having a free end and an engine end opposite from the free end;
   housing mounting means at the engine end of the housing for mounting the housing to the engine;
   a shaft coaxial with and extending through the housing;
   means for mounting the shaft rotatably relative to the housing;
   an exciter field assembly fixed to and inside of the housing, said exciter field assembly including a plurality of laminations which are stacked together;
   an exciter armature which is mounted on the shaft to rotate with the shaft at an axial location in alignment with the exciter field assembly so that the exciter armature is radially inside of the exciter field assembly, said exciter armature including a plurality of laminations which are stacked together;
   a rotor mounted on the shaft inside the housing, said rotor including a plurality of laminations which are stacked together;
   a stator fixed to and inside of the housing at an axial location in alignment with the rotor so that the rotor is radially inside of the stator, said stator including a plurality of laminations which are stacked together; and
   wherein:
   the housing has integral raised ribs which extend axially and are circumferentially spaced apart around the interior of the housing, said ribs defining open spaces between them and defining an internal bore of the housing in which the stator and the exciter field assembly are mounted;
   a fan is mounted on the shaft outside the housing at the free end of the housing, said fan rotating with the shaft to draw cooling air into the housing through air intake slots located at the engine end of the housing and past the stator through the open spaces defined by the raised ribs, and to exhaust the cooling air out through the free end of the housing;
   the housing is enlarged at the engine end to produce a bell shape;
   the air intake slots are located in the enlarged portion of the housing; and
   the raised ribs which define the internal bore of the housing extend into and become deeper in the enlarged portion of the housing.

2. A brushless alternator as in claim 1, wherein the exciter field assembly is secured inside the raised ribs at an axial location inside the enlarged portion of the housing.

3. A brushless alternator as in claim 1, wherein are the laminations of the stator and exciter field assembly are shaped to receive the raised ribs and form the open spaces between the raised ribs.

4. A brushless alternator, comprising:
a housing having an engine end and a free end opposite from the engine end;
housing mounting means at the engine end of the housing for mounting the housing to a prime mover;
a shaft coaxial with and extending through the housing;
means for mounting the shaft rotating relative to the housing;
an exciter field assembly fixed to and inside of the housing, said exciter field assembly including a plurality of laminations which are stacked together;
an exciter armature which is mounted on the shaft to rotate with the shaft at an axial location in alignment with the exciter field assembly so that the exciter armature is radially inside of the exciter field assembly, said exciter armature including a plurality of laminations which are stacked together;
a rotor mounted on the shaft inside the housing, said rotor including a plurality of laminations which are stacked together;
a stator fixed to and inside of the housing at an axial location in alignment with the rotor so that the rotor is radially inside of the stator, said stator including a plurality of laminations which are stacked together;
cooling air intake means at the engine end of the housing;
exhaust vent means at the free end of the housing;
fan means outside of the housing at the free end of the housing for drawing cooling air through the exhaust vent means;
means inside the housing for defining a cooling air flow path from the cooling air intake means to the exhaust vent means; and
wherein:
a drive hub is positioned on the shaft at the engine end of the housing to drivingly couple the shaft to a prime mover to which the housing is mounted; and
the drive hub is slip fit on the shaft and bolted to the exciter armature.

5. A brushless alternator as in claim 4, wherein the drive hub is replaceable with a drive hub of a different length to adapt the alternator to a different prime mover.

6. A brushless alternator as in claim 4, wherein the cooling air intake means admit air to the interior of the housing past the outside of the exciter field assembly.

7. A brushless alternator, comprising:
a housing having an engine end and a free end opposite from the engine end;
housing mounting means at the engine end of the housing for mounting the housing to a prime mover;
a shaft coaxial with and extending through the housing;
means for mounting the shaft rotatably relative to the housing;
an exciter field assembly fixed to and inside of the housing, said exciter field assembly including a plurality of laminations which are stacked together;
an exciter armature which is mounted on the shaft to rotate with the shaft at an axial location in alignment with the exciter field assembly so that the exciter armature is radially inside of the exciter field assembly, said exciter armature including a plurality of laminations which are stacked together;
a rotor mounted on the shaft inside the housing, said rotor including a plurality of laminations which are stacked together;
a stator fixed to and inside of the housing at an axial location in alignment with the rotor so that the rotor is radially inside of the stator, said stator including a plurality of laminations which are stacked together;
cooling air intake means at the engine end of the housing;
exhaust vent means at the free end of the housing;
fan means outside of the housing at the free end of the housing to draw cooling air through the exhaust vent means;
means inside the housing for defining a cooling air flow path from the cooling air intake means to the exhaust vent means; and
wherein:
a drive hub is positioned on the shaft at the engine end of the housing to drivingly couple the shaft to a prime mover to which the housing is mounted;
the drive hub is bolted to the exciter armature;
the shaft has a flange which is integral with the shaft; and
the drive hub is slip fit onto the shaft and is also bolted to the flange.

8. A brushless alternator as in claim 7, wherein the exciter armature is slip fit onto the shaft and is sandwiched between the drive hub and the flange.

9. A brushless alternator, comprising:
a housing having an engine end and a free end opposite from the engine end;
housing mounting means at the engine end of the housing for mounting the housing to a prime mover;
a shaft coaxial with and extending through the housing;
means for mounting the shaft rotatably relative to the housing;
an exciter field assembly fixed to and inside the housing, said exciter field assembly including a plurality of laminations which are stacked together;
an exciter armature which is mounted on the shaft to rotate with the shaft at an axial location in alignment with the exciter field assembly so that the exciter armature is radially inside of the exciter field assembly, said exciter armature including a plurality of laminations which are stacked together;
a rotor mounted on the shaft inside the housing, said rotor including a plurality of laminations which are stacked together;
a stator fixed to and inside of the housing at an axial location in alignment with the rotor so that the rotor is radially inside of the stator, said stator including a plurality of laminations which are stacked together;

cooling air intake means at the engine end of the housing;

exhaust vent means at the free end of the housing;

fan means outside of the housing at the free end of the housing to draw cooling air through the exhaust vent means;

means inside the housing for defining a cooling air flow path from the cooling air intake means to the exhaust vent means; and wherein:

a drive hub is positioned on the shaft at the engine end of the housing to drivingly couple the shaft to a prime mover to which the housing is mounted;

the drive hub is bolted to the exciter armature;

the shaft has a flange which is integral with the shaft;

the exciter armature is slip fit on the shaft;

the drive hub is slip fit onto the shaft; and the exciter armature and the drive hub are fastened to the flange.

10. A brushless alternator, comprising:

a housing having an engine end and a free end opposite from the engine end;

housing mounting means at the engine end of the housing for mounting the housing to a prime mover;

a shaft coaxial with and extending through the housing;

means for mounting the shaft rotatably relative to the housing;

an exciter field assembly fixed to and inside of the housing, said exciter field assembly including a plurality of laminations which are stacked together;

an exciter armature which is mounted on the shaft to rotate with the shaft at an axial location in alignment with the exciter field assembly so that the exciter armature is radially inside of the exciter field assembly, said exciter armature including a plurality of laminations which are stacked together;

a rotor mounted on the shaft inside the housing, said rotor including a plurality of laminations which are stacked together;

a stator fixed to and inside of the housing at an axial locations in alignment with the rotor so that the rotor is radially inside of the stator, said stator including a plurality of laminations which are stacked together;

cooling air intake means at the engine end of the housing;

exhaust vent means at the free end of the housing;

fan means outside of the housing at the free end of the housing to draw cooling air through the exhaust vent means;

means inside the housing for defining a cooling air flow path from the cooling air intake means to the exhaust vent means; and wherein:

the cooling air intake means admit air to the interior of the housing pas the outside of the exciter field assembly; and the cooling air intake means are slots in the housing which extend axially away from the exciter field assembly toward the stator.

* * * * *